(12) United States Patent
Kordel et al.

(10) Patent No.: US 10,647,407 B2
(45) Date of Patent: May 12, 2020

(54) WING FLAP WITH TORQUE MEMBER AND METHOD FOR FORMING THEREOF

(71) Applicant: The Boeing Company, Chicago, IL (US)

(72) Inventors: Jan A. Kordel, Redmond, WA (US); Michael A. Balzer, Bellevue, WA (US); Mark M. Bleazard, Snohomish, WA (US); Jacob D. Virnig, Woodinville, WA (US); Wendell C. K. Choy, Kirkland, WA (US); Gregory M. Santini, Bothell, WA (US)

(73) Assignee: The Boeing Company, Chicago, IL (US)

(*) Notice: Subject to any disclaimer, the term of this patent is extended or adjusted under 35 U.S.C. 154(b) by 86 days.

(21) Appl. No.: 15/975,903

(22) Filed: May 10, 2018

(65) Prior Publication Data

US 2019/0300149 A1   Oct. 3, 2019

Related U.S. Application Data

(63) Continuation-in-part of application No. 15/941,378, filed on Mar. 30, 2018.

(51) Int. Cl.
| | | |
|---|---|---|
| *B64C 9/02* | (2006.01) | |
| *B64C 3/26* | (2006.01) | |
| *B64C 3/18* | (2006.01) | |
| *B64C 9/16* | (2006.01) | |
| *B64C 3/20* | (2006.01) | |

(52) U.S. Cl.
CPC ............... *B64C 9/02* (2013.01); *B64C 3/185* (2013.01); *B64C 3/187* (2013.01); *B64C 3/20* (2013.01); *B64C 3/26* (2013.01); *B64C 9/16* (2013.01)

(58) Field of Classification Search
CPC .. B64C 3/385; B64C 3/18; B64C 1/26; B64C 9/16; B64C 9/18; B64C 9/02; B64C 3/26
See application file for complete search history.

(56) References Cited

U.S. PATENT DOCUMENTS

| | | | | |
|---|---|---|---|---|
| 2,271,509 A | * | 1/1942 | Fernand ................. | B64C 3/385 244/231 |
| 2,932,473 A | * | 4/1960 | Kass ....................... | B64C 9/02 244/90 R |
| 3,002,717 A | * | 10/1961 | Pavlecka ................ | B64C 3/26 244/124 |
| 3,229,935 A | * | 1/1966 | Bellanca ................ | B64C 3/26 244/123.5 |

(Continued)

OTHER PUBLICATIONS

European Patent Office, "Extended European Search Report," App. No. 19165879.8 (dated Jul. 23, 2019).

(Continued)

*Primary Examiner* — Philip J Bonzell
*Assistant Examiner* — Michael B. Kreiner
(74) *Attorney, Agent, or Firm* — Walters & Wasylyna LLC

(57) ABSTRACT

A wing flap includes a flap body. The flap body includes an upper skin, a lower skin opposite the upper skin, and a plurality of spars that extend between the upper skin and the lower skin. The wing flap also includes a torque member that is coupled to the flap body. A portion of the torque member is contiguous with at least one of the upper skin and the lower skin.

20 Claims, 12 Drawing Sheets

(56) References Cited

U.S. PATENT DOCUMENTS

| | | | | |
|---|---|---|---|---|
| 3,883,093 A * | 5/1975 | Violleau | B64C 9/02 | 244/215 |
| 4,576,347 A | 3/1986 | Opsahl | | |
| 4,667,905 A * | 5/1987 | Hamm | B64C 3/18 | 244/123.13 |
| 4,962,904 A * | 10/1990 | Perry | B29C 70/845 | 244/131 |
| 5,501,414 A * | 3/1996 | Bauer | B64C 3/18 | 244/123.4 |
| 5,884,872 A * | 3/1999 | Greenhalgh | B64C 9/02 | 244/130 |
| 6,237,873 B1 | 5/2001 | Amaoka et al. | | |
| 6,698,688 B1 * | 3/2004 | Jones | B64C 1/26 | 244/99.3 |
| 6,843,450 B2 * | 1/2005 | Bath | B64C 1/26 | 244/131 |
| 7,552,895 B2 * | 6/2009 | From | B64C 3/18 | 244/101 |
| 7,744,034 B2 | 6/2010 | Coughlin | | |
| 7,992,825 B2 * | 8/2011 | Llamas Sandin | B64C 9/00 | 244/211 |
| 8,038,093 B2 * | 10/2011 | Llamas Sandin | B64C 9/02 | 244/87 |
| 8,342,451 B1 * | 1/2013 | Lutke | B64C 1/34 | 244/123.11 |
| 8,360,359 B2 * | 1/2013 | Llamas Sandin | B64C 5/02 | 244/87 |
| 9,248,900 B2 * | 2/2016 | Jareño Diz Lois | B64C 3/18 | |
| 9,248,903 B2 | 2/2016 | Eden | | |
| 9,527,577 B2 * | 12/2016 | Embacher | B64C 5/16 | |
| 9,545,992 B2 * | 1/2017 | Guering | B64C 9/02 | |
| 9,623,957 B2 | 4/2017 | Bleazard | | |
| 9,669,581 B2 * | 6/2017 | Garcia Martin | B29D 99/0014 | |
| 9,739,316 B2 | 8/2017 | Schwartz et al. | | |
| 9,828,096 B2 * | 11/2017 | Veto | B64D 1/02 | |
| 10,145,434 B2 * | 12/2018 | Fox | F16F 7/1022 | |
| 2004/0145080 A1 * | 7/2004 | Tanaka | B29C 70/443 | 264/257 |
| 2010/0019083 A1 | 1/2010 | Llamas et al. | | |
| 2010/0107513 A1 * | 5/2010 | Buchanan | B64C 3/18 | 52/84 |
| 2015/0329197 A1 | 11/2015 | Seack et al. | | |
| 2017/0010697 A1 | 4/2017 | Stawski | | |
| 2018/0117841 A1 * | 5/2018 | Tyler | B64C 1/12 | |
| 2018/0222571 A1 * | 8/2018 | Santini | B64C 9/16 | |

OTHER PUBLICATIONS

European Patent Office, "Extended European Search Report," App. No. 19165894.7 (dated Jul. 23, 2019).

* cited by examiner

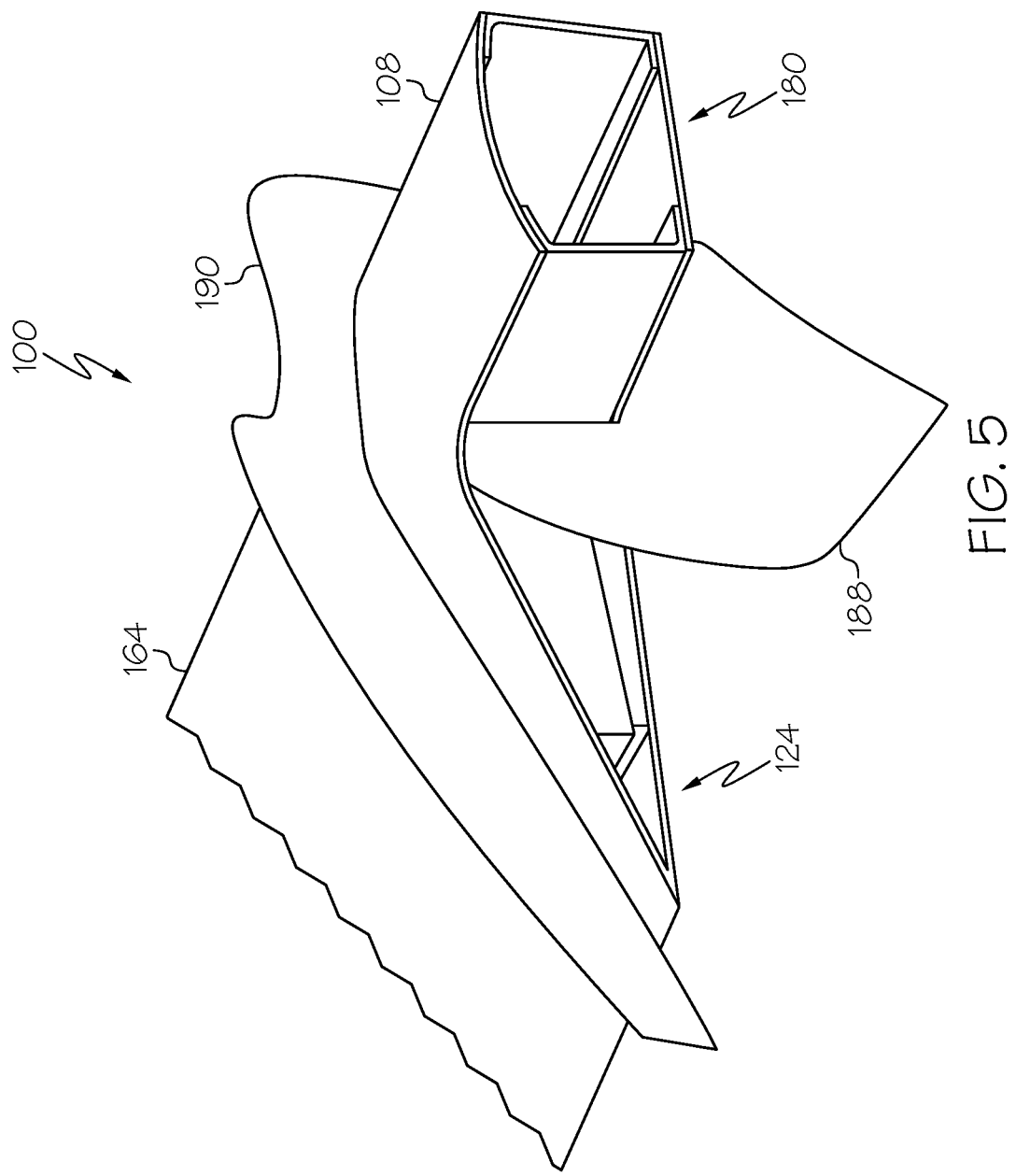

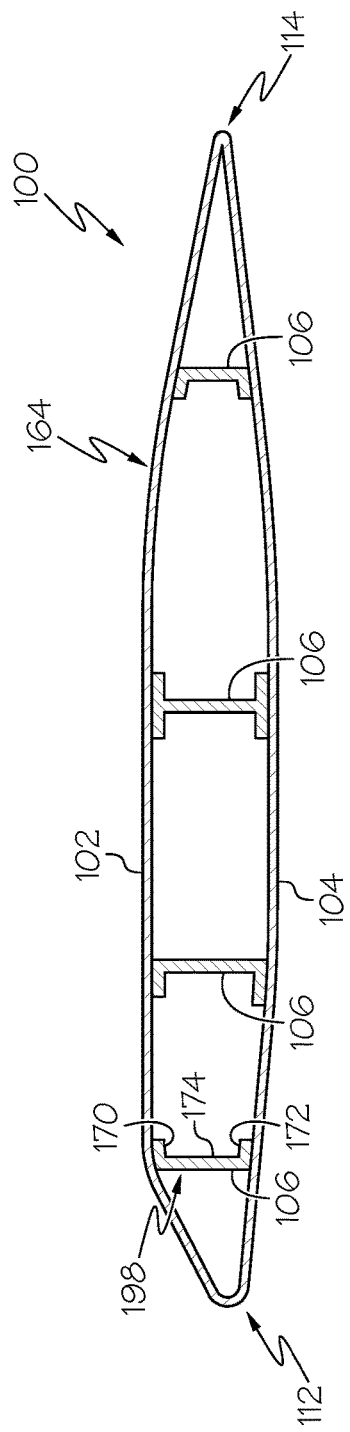
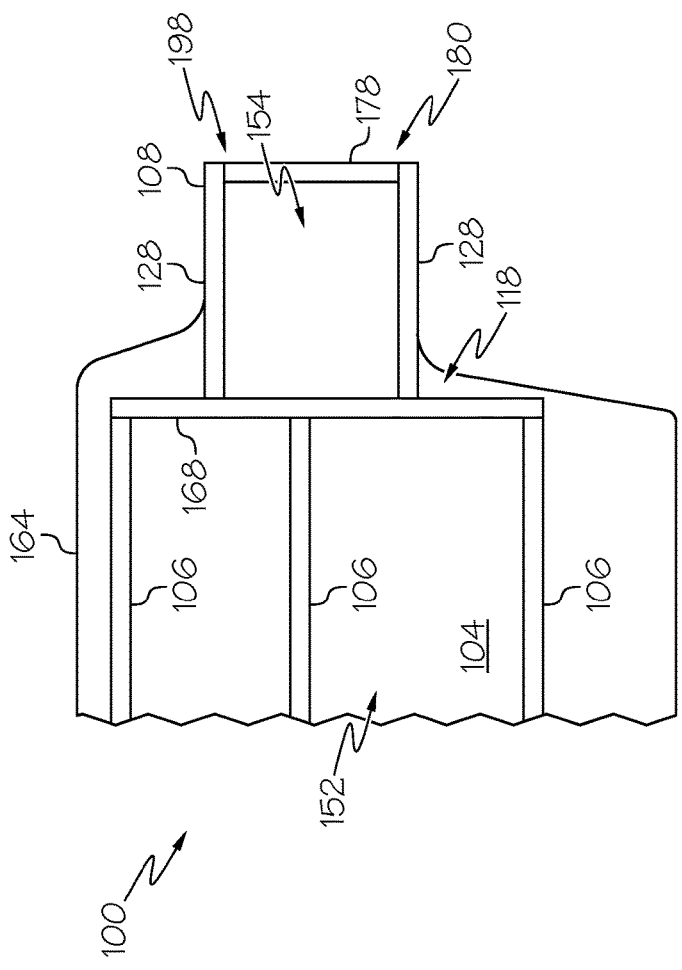

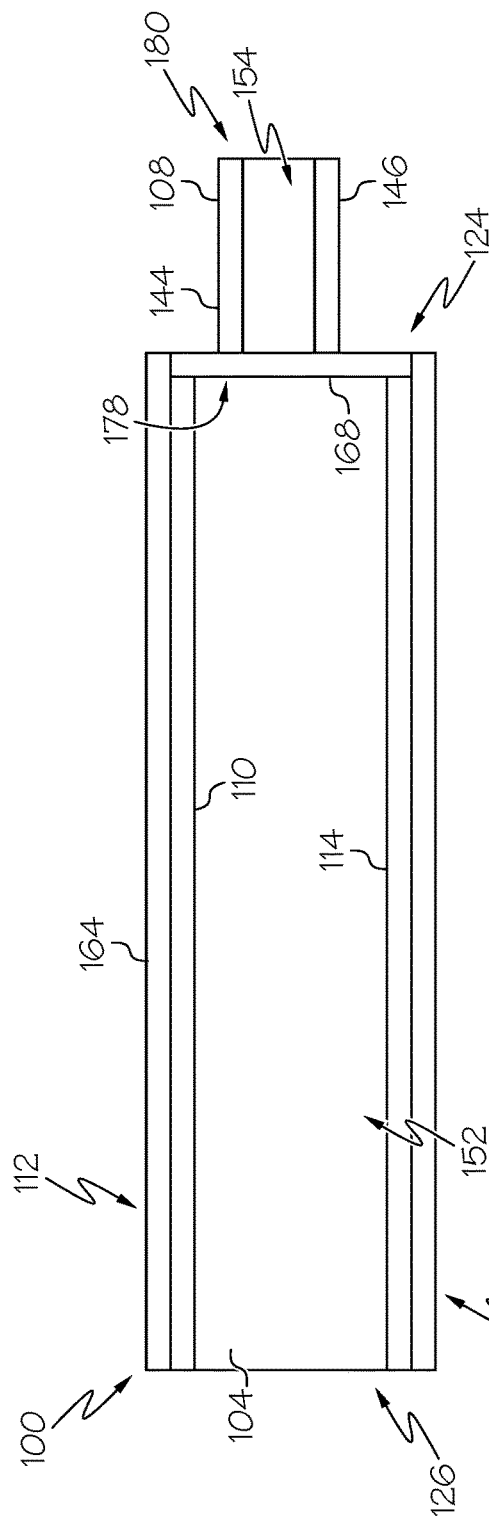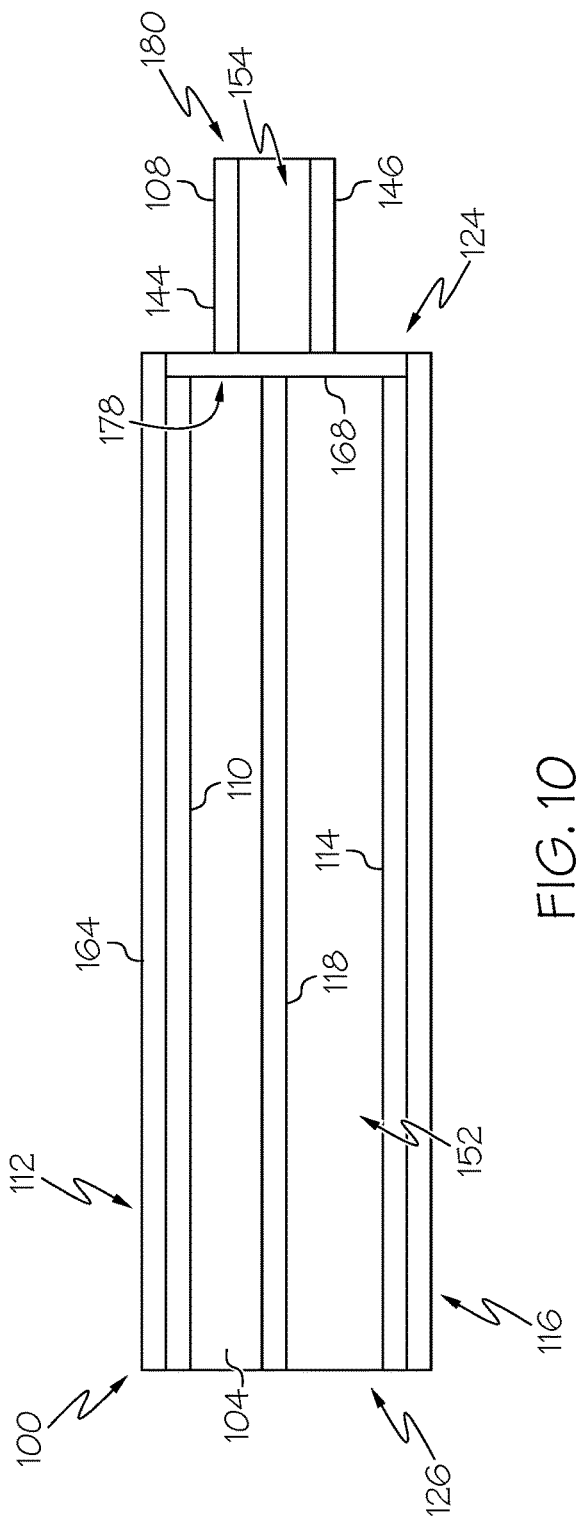

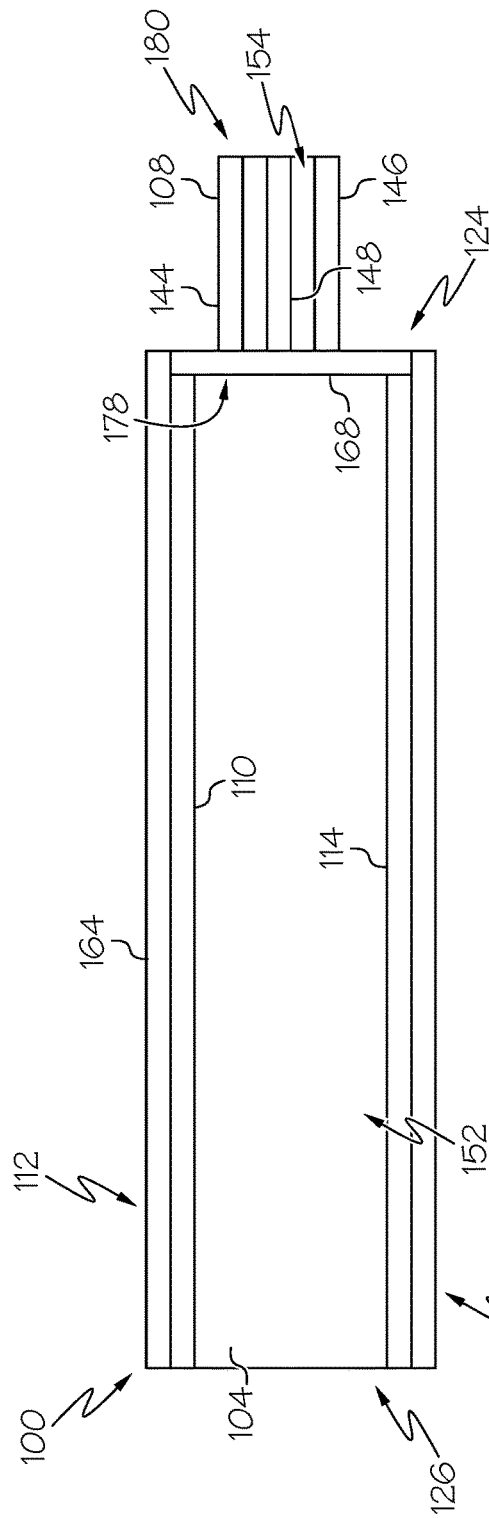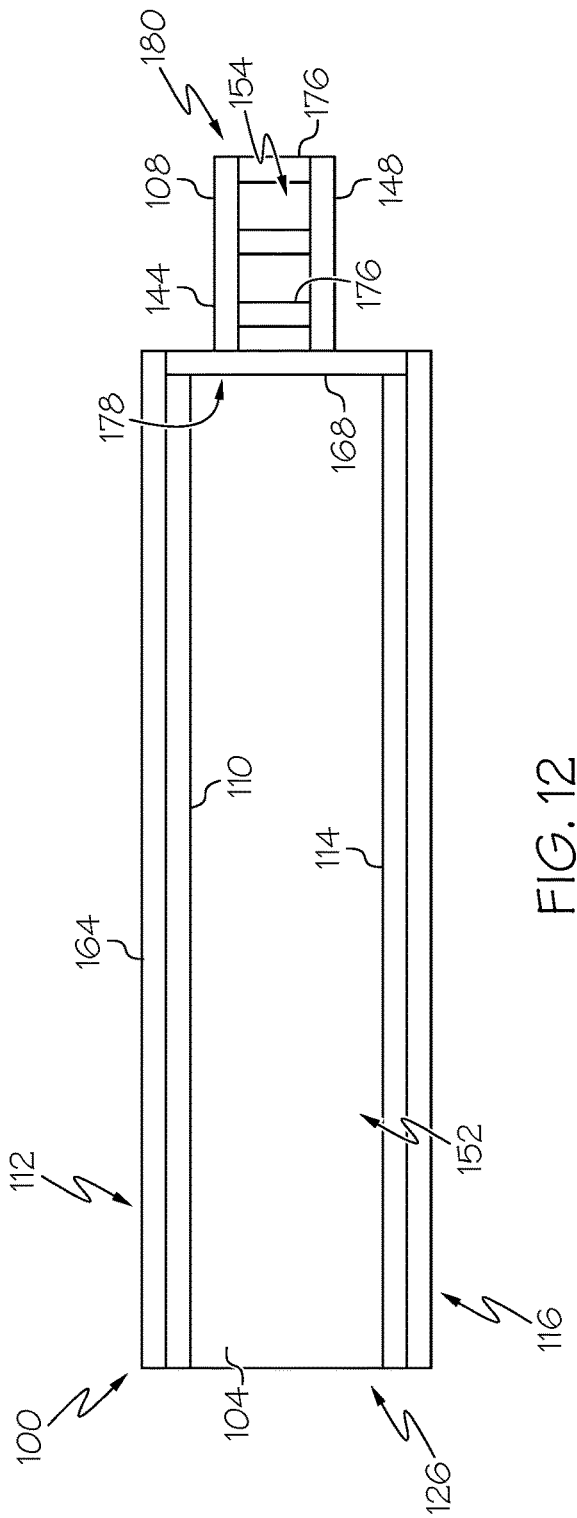

WING FLAP WITH TORQUE MEMBER AND METHOD FOR FORMING THEREOF

PRIORITY

This application is a continuation-in-part of U.S. Ser. No. 15/941,378 filed on Mar. 30, 2018.

FIELD

The present disclosure is generally related to aircraft and, more particularly, to an aircraft wing flap having a torque member and a method for forming the wing flap.

BACKGROUND

Fixed-wing aircraft typically include various flight control surfaces that enable adjustment and control of the aircraft's flight. For example, flaps mounted on trailing edges of wings modify the effective contour of the wings and, thus, modify the lift characteristics of the wings. In certain types of flap systems, an inboard flap includes a torque member that is used to move the flap between stowed and deployed positions. Typically, the torque member extends into the side of the fuselage, or into a wing fairing structure of the fuselage, and is coupled to a flap support mechanism that controls movement of the flap.

In many flap systems, the torque member is a tubular structure having a circular cross-sectional shape, commonly referred to as a torque tube. The torque tube is typically coupled to a structural member of the flap, such as an inboard rib. However, achieving appropriate structural and load-bearing performance can require a heavy torque tube and large and complex couplings that increase the weight and cost of the aircraft. Additionally, some flap systems utilize a failsafe torque tube that includes a dual torque tube design that further increases the cost, weight, and complexity of the aircraft.

Accordingly, those skilled in the art continue with research and development efforts in the field of aircraft wing flap actuation.

SUMMARY

In an example, the disclosed wing flap includes a flap body. The flap body includes an upper skin, a lower skin opposite the upper skin, and a plurality of spars that extend between the upper skin and the lower skin. The wing flap also includes a torque member that is coupled to the flap body. A portion of the torque member is contiguous with at least one of the upper skin and the lower skin.

In an example, the disclosed wing of an aircraft includes a wing body and a wing flap. The wing flap includes a flap body 164 that is movably coupled with the wing body. The flap body includes an upper skin, a lower skin opposite the upper skin, and a plurality of spars that extend between the upper skin and the lower skin. The wing flap also includes a torque member that is coupled to the flap body. A portion of the torque member is contiguous with at least one of the upper skin and the lower skin.

In an example, the disclosed method includes steps of: (1) joining an upper skin, a lower skin, and a plurality of spars to partially form a flap body and (2) coupling a plurality of extension members to the flap body to partially form a torque tube. The flap body is configured to be movably coupled with a wing of an aircraft. The torque member is configured to be coupled to a flap actuator of the aircraft.

Other examples of the disclosed wing flap and method will become apparent from the following detailed description, the accompanying drawings and the appended claims.

BRIEF DESCRIPTION OF THE DRAWINGS

FIG. 5 is a schematic, partial, perspective view of an example of the disclosed wing flap;

FIG. 6 is a schematic, elevation, cross-sectional view of an example of a disclosed wing flap;

FIG. 7 is a schematic, partial, plan view of an example of the disclosed wing flap;

FIG. 9 is a schematic, partial, plan view of an example of the disclosed wing flap;

FIG. 10 is a schematic, partial, plan view of an example of the disclosed wing flap;

FIG. 11 is a schematic, partial, plan view of an example of the disclosed wing flap;

FIG. 12 is a schematic, partial, plan view of an example of the disclosed wing flap;

DETAILED DESCRIPTION

Figure 1:
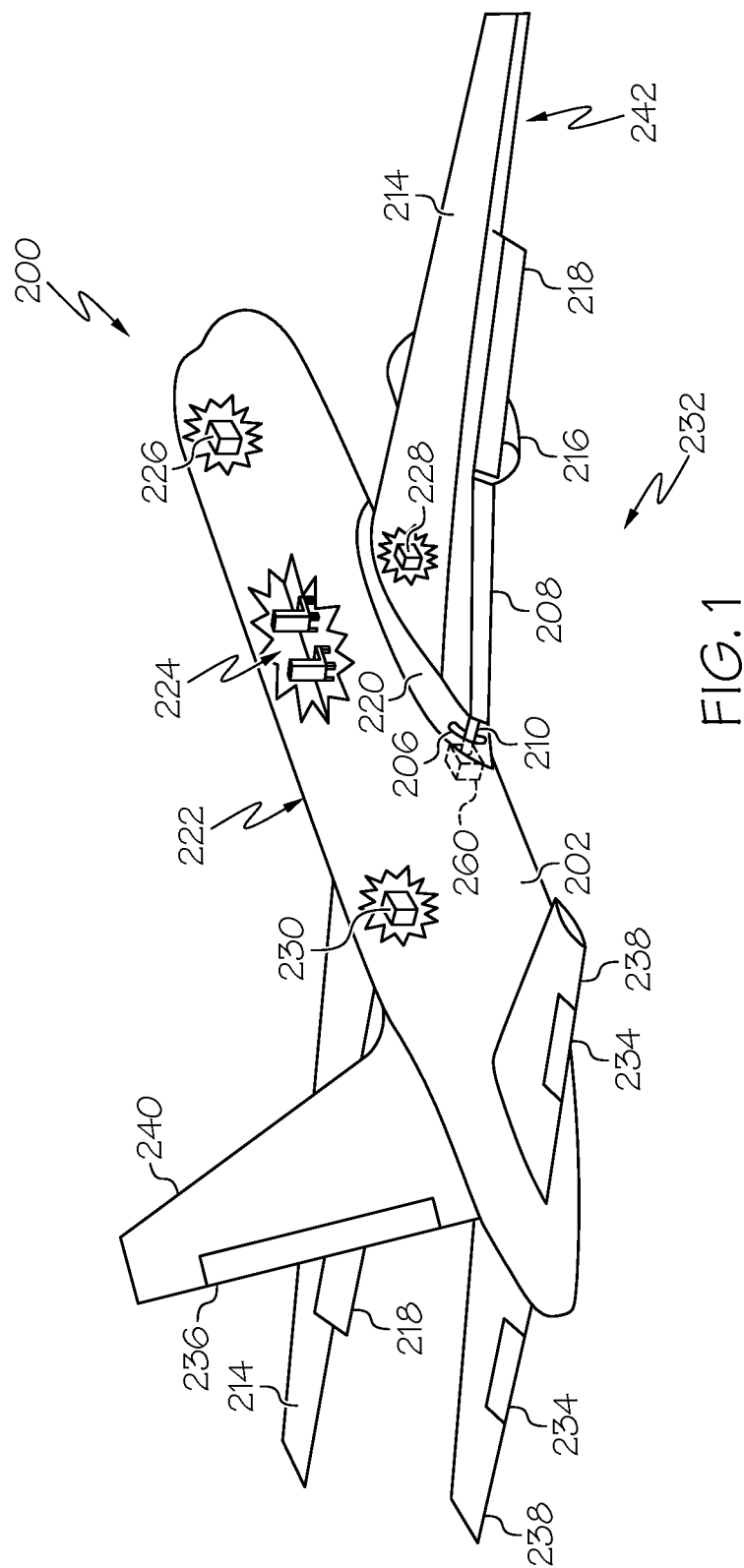
FIG. 1 is a schematic, perspective view of an example of an aircraft.

The following detailed description refers to the accompanying drawings, which illustrate specific examples described by the disclosure. Other examples having different structures and operations do not depart from the scope of the present disclosure. Like reference numerals may refer to the same feature, element or component in the different drawings.

Illustrative, non-exhaustive examples, which may be, but are not necessarily, claimed, of the subject matter according the present disclosure are provided below.

FIG. 1 is an illustrative example of an aircraft 200. In the illustrative example, the aircraft 200 is a fixed-wing aircraft. The aircraft 200 includes a fuselage 202, a pair of wings 214 (also referred to individually as wing 214), and a propulsion system 216. The aircraft 200 also includes a plurality of high-level systems, such as, but not limited to, an electrical system 226, a hydraulic system 228, and/or an environmental system 230. Any number of other systems may also be included.

The fuselage 202 is the main body of the aircraft 200 and includes any suitable central structure configured to hold a crew, one or more passengers, and/or cargo. In the illustrative example, the fuselage 202 is an elongate, generally cylindrical fuselage. The fuselage 202 includes a nose portion at a forward end of the fuselage 202 and a tail portion at an aft end of the fuselage 202. As used herein, the terms "forward" and "aft" have their ordinary meaning as known to those skilled in the art and refer to positions relative to a direction of movement of the aircraft 200. The tail portion may also include a vertical stabilizer 240 and horizontal stabilizers 238.

The fuselage 202 includes an airframe 222 that defines an interior 224, which may include a passenger compartment and/or a cargo compartment. A wing fairing structure 220 (e.g., fuselage/wing fairing) may also be provided at each interface between the fuselage 202 and the wing 214 and may extend from proximate (at or near) the fuselage 202 to proximate the wing 214 associated therewith.

The wings 214 include any suitable airfoil structures that are configured to provide lift to the aircraft 200. In the illustrative example, the wings 214 are elongate structures extending from a lower portion of the fuselage 202 in a swept wing, tapered planform. In other examples, the wings 214 are straight or delta-shaped. In still other examples, the wings 214 are trapezoidal, constant, elliptical, semi-elliptical, or other configurations known in the art.

In the illustrative example, the propulsion system 216 includes two turbofan engines mounted to the wings 214, for example, by pylons. In an example, each engine is housed in a nacelle, which includes an inlet and a nozzle. In other examples, the engines may be mounted to the fuselage 202 or other aircraft structures, such as the tail portion. In various other examples, the propulsion system 216 may include more or fewer engines and other types of engines (e.g., turboprop engines) may be used.

The aircraft 200 includes various flight control surfaces 232. The flight control surfaces 232 include any pivoting aerodynamic device that is used to adjust and control flight and aerodynamic characteristics of the aircraft 200. Examples of the flight control surfaces 232 include an inboard flap 208 and/or an outboard flap 218 that are located on the trailing end of the wings 214, an elevator 234 that is located on the trailing end of the horizontal stabilizers 238, a rudder 236 that is located on the trailing end of the vertical stabilizer 240, and other control surfaces, such as leading end flaps, ailerons, and spoilers. As used herein, the terms "inboard" and "outboard" have their ordinary meaning as known to those skilled in the art and refer to positions relative to a center line of the aircraft 200.

In an example, the inboard flap 208 (also referred to collectively as inboard flaps 208) and/or the outboard flap 218 (also referred to collectively as outboard flaps 218) include any suitable structure mounted on the trailing edge of the wing 214 and configured to pivot, rotate, and/or translate (e.g., forward and aft) relative to the wig 214. The inboard flaps 208 and/or the outboard flaps 218 are configured to alter the lift characteristics of the wing 214. The inboard flaps 208 and/or the outboard flaps 218 are movable between at least a raised (stowed, retracted, or "flaps up") position and a lowered (deployed, extended, or "flaps down") position. In an example, the inboard flaps 208 and/or the outboard flaps 218 are pivotable about a fixed axis. In an example, the inboard flaps 208 and/or the outboard flaps 218 pivot through a predetermined path, which is generally arcuate of curved.

In an example, the aircraft 200 also includes a flap actuator 260. The flap actuator 260 is associated with each wing 214 for actuating the inboard flap 208. In an example, the flap actuator 260 includes a motorized arm that is located, or housed, within the fuselage 202, or the wing fairing structure 220.

In an example, a torque member 210 couples the flap actuator 260 with the associated inboard flap 208 to transfer an actuating/de-actuating (e.g., lowering/raising) force from the flap actuator 260 to the associated inboard flap 208. The torque member 210 extends through an opening 206 in the aircraft 200 (e.g., an opening 206 in the fuselage 202 or the wing fairing structure 220). The opening 206 in the aircraft 200 is sized and shaped to accommodate a travel path of the torque member 210 as the inboard flap 208 is lowered and raised.

Figure 2:
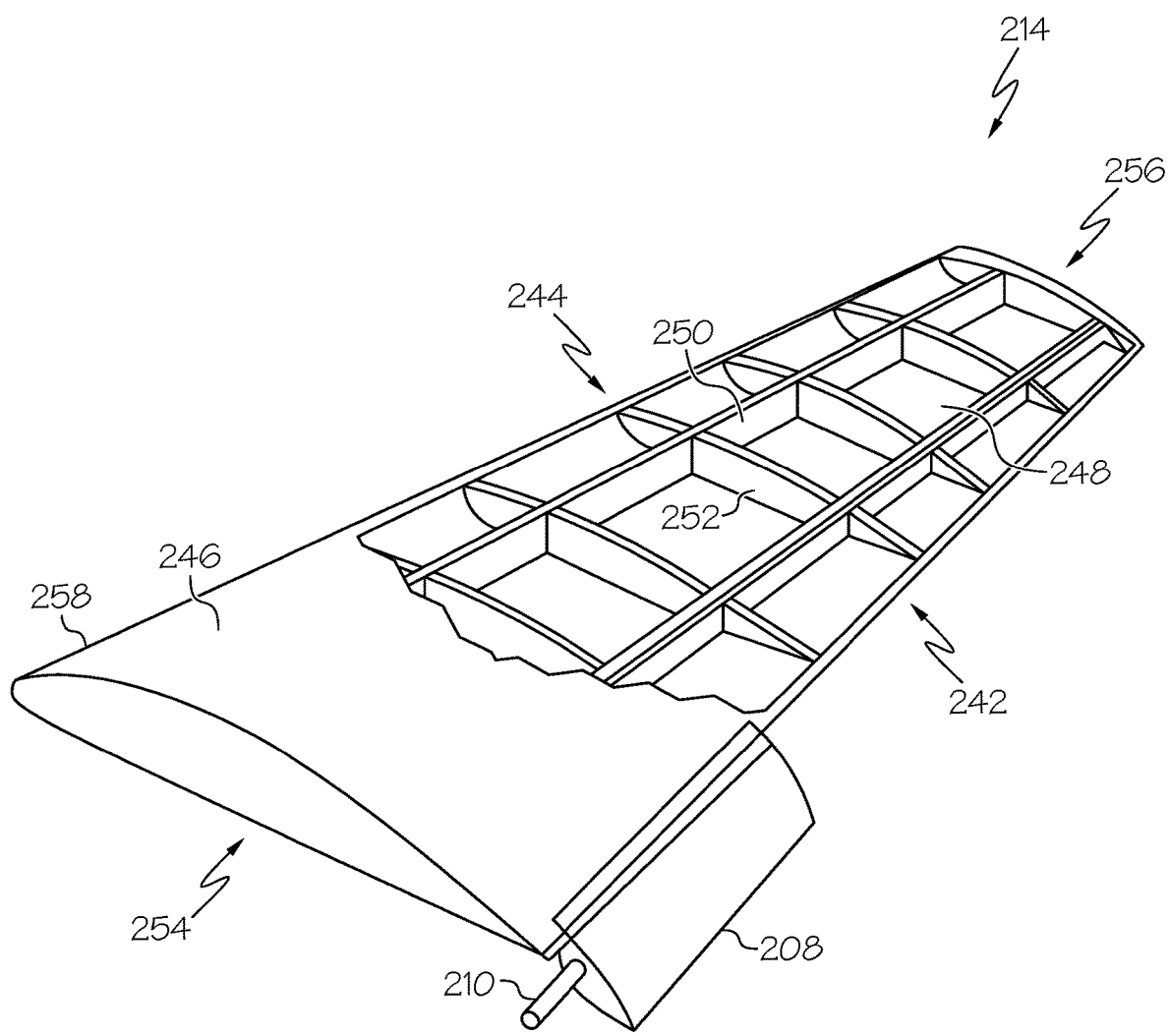
FIG. 2 is a schematic, perspective view of an example of a wing of the aircraft.

FIG. 2 is an illustrative example of the wing 214. The wing 214 is any one of various wing structures that includes a wing body 258. The wing body 258 that is formed of various structural members including, but not limited to, an upper wing skin 246, a lower wing skin 248, a plurality of wing spars 250 that extend between the upper wing skin 246 and the lower wing skin 248, and a plurality of wing ribs 252 that extend between the upper wing skin 246 and the lower wing skin 248. These structural members are coupled together by any one of various methods including, but not limited to, connection by various kinds of fasteners, co-curing, or integrally forming. The wing spars 250 extend in a span-wise direction between a wing root 254 of the wing 214 and a wing tip 256 of the wing 214. The wing ribs 252 extend in a chord-wise direction between a leading edge 244 of the wing 214 and a trailing edge 242 of the wing 214. The wing 214 further includes a wing flap 100. An example of the disclosed wing flap 100 is movably coupled with the wing 214 at the trailing edge 242 of the wing 214 proximate to the wing root 254.

Referring to FIGS. 3-13 disclosed are various examples of the wing flap 100. The disclosed wing flap 100 includes a flap body 164 and a torque member 108 that is coupled to the flap body 164. The torque member 108 extends from the inboard end 124 of the flap body 164 in an inboard direction. In an example, the flap body 164 includes an upper skin 102, a lower skin 104 opposite the upper skin 102, and a plurality of spars 106 (also referred to individually as spar 106 and collectively as spars 106) that extend between the upper skin 102 and the lower skin 104. A portion of the torque member 108 is contiguous with at least one of the upper skin 102 and the lower skin 104. As used herein, the term "contiguous" refers to a condition in which a first item is in contact with and shares at least one border with a second item or items that are adjoined along a shared border.

The wing flap 100 is an example of the inboard flap 208 of the wing 214 of the aircraft 200 and the torque member 108 is an example of the torque member 210 of the inboard flap 208 (FIG. 1). In other examples, the teachings of the present disclosure may be applied to one or more other flight control surfaces 232 of the aircraft 200.

In an example, the wing flap 100 includes any suitable pivoting structure that is mounted on, or is otherwise movably coupled with, the wing body 258 of the wing 214 at the trailing edge 242 of the wing 214 (FIGS. 1 and 2). In an example, the wing flap 100 is located adjacent to the wing fairing structure 220 of the fuselage 202 of the aircraft 200. During operation of the wing flap 100, the wing flap 100 is movable between at least a raised (stowed, retracted, or "flaps up") position and a lowered (deployed, extended, or "flaps down") position to alter the lift characteristics of the wing.

Figure 3:
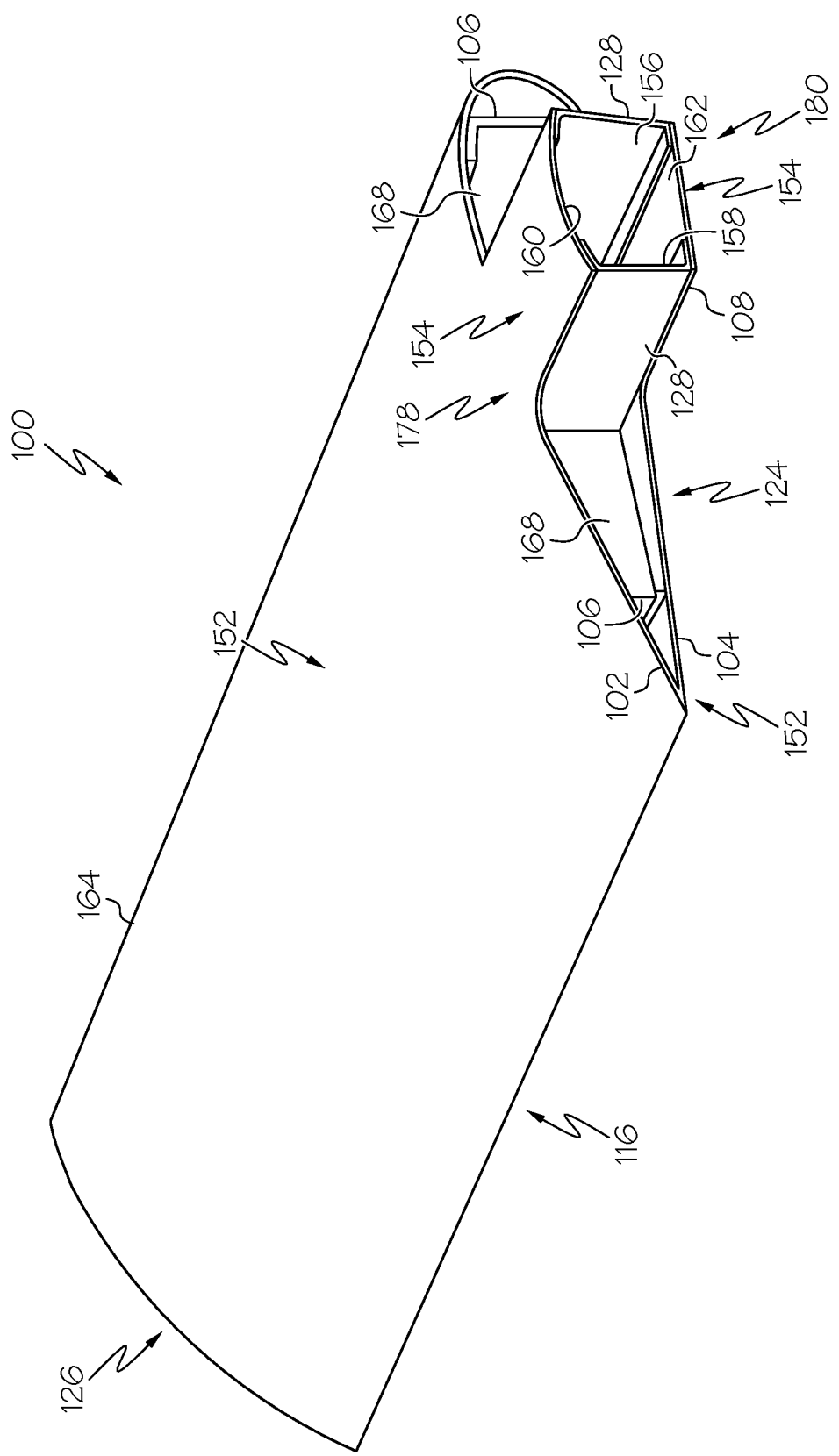
FIG. 3 is a schematic, perspective view of an example of a disclosed wing flap.

Referring to FIG. 3, the flap body 164 includes an inboard end 124 and an outboard end 126 opposite the inboard end 124. The flap body 164 also includes a leading end 112 and a trailing end 116 opposite the leading end 112. The torque member 108 includes an inboard end 180 and an outboard end 178 opposite the inboard end 180. In an example, the torque member 108 is coupled to the inboard end 124 of the flap body 164 and extends outward from the inboard end 124 of the flap body 164 in an inboard direction.

In an example, the torque member 108 includes a plurality of extension members 128 (also referred to individually as extension member 128 and collectively as extension members 128). Each one of the extension members 128 is coupled to the flap body 164 at the inboard end 124 and extends from the inboard end 124 in an inboard direction. In an example, each one of the extension members 128 is parallel to an adjacent one of the plurality of extension member 128.

As used herein, the term "parallel" has its ordinary meaning as known to those skilled in the art and refers to a condition in which a first line, extending longitudinally through a first item, and a second line, extending longitudinally through a second item, share a common plane and the first line and the second line being equidistant from one another. As used herein, the term "parallel" includes exactly parallel and approximately parallel (i.e., close to parallel that still performs the desired function or achieves the desired result). As used herein, the term "adjacent" refers to a condition in which a first item directly neighbors, or is directly next to, a second item.

In an example, the extension members 128 that partially form the torque member 108 define structural members of the torque member 108. As used herein, the phrase "structural member," with reference to any one of a plurality of structural members that partially form the torque member 108, refers to a load-bearing element that is configured to carry a load or react to stresses applied to the torque member 108.

In an example, the flap body 164 includes an inboard rib 168 that extends between an adjacent pair of the plurality of spars 106 at the inboard end 124 of the flap body 164. Each one of the plurality of extension members 128 is coupled to the inboard rib 168. In an example, the inboard rib 168 includes a stiffener, or flange, that is vertically oriented and that is located on an inboard face of the inboard rib 168. In an example, each one of the extension members 128 is fastened (e.g., bolted) to the stiffener of the inboard rib 168. Any other suitable joint may be used to couple an outboard end of the extension member 128 to the inboard rib 168.

Each one of the extension members 128 and/or the inboard rib 168 may be formed of any suitable structural material. In an example, the extension members 128 and/or the inboard rib 168 are formed of a metallic material. In an example, the extension members 128 and the inboard rib 168 are formed of a composite material. An example of a composite material is a fiber-reinforced polymer that includes a polymer matrix (e.g., a thermoset resin or a thermoplastic polymer) that is reinforced with fibers (e.g., glass, carbon, aramid, etc.). As an example, the composite material is a carbon fiber reinforced polymer.

In various examples, each one of the extension members 128 has one of any number of different sizes and/or cross-sectional shapes. Generally, the size and/or cross-sectional shape of any one of the extension members 128 depends on, and may be balanced between, various factors including, but not limited to, stiffness and/or strength requirements to adequately react to loads applied to the torque member 108 and/or the wing flap 100, failsafety requirements of the torque member 108, the size of the opening 206 (FIG. 4) in the fuselage 202 required to accommodate the torque member 108, and the like. The size and/or cross-sectional shape of the individual extension members 128 and of the torque member 108 as a whole may be a factor in the location of the torque member 108 relative to the flap body 164 (e.g., toward the leading end 112 or toward the trailing end 116).

The torque member 108 being formed by the extension members 128, which are coupled to the inboard rib 168 of the flap body 164 may reduce the cost, complexity, and/or weight of the wing flap 100 and may reduce the cost, complexity, and/or weight associated with production of the aircraft wing and/or the aircraft. For example, forming the torque member 108 from the extension members 128 is less costly than fabricating a metal (e.g., titanium or steel) torque tube and reduces the components and time required to assemble and join the torque member 108 as compared to the metal torque tube. As an example, the extension members 128 of the torque member 108 being formed from a composite material may reduce the weight of the aircraft wing as compared to a traditional steel torque tube. As an example, joining the torque member 108 with the flap body 164 by coupling each one of the extension members 128 to the inboard rib 168 may reduce the complexity and cost associated with coupling the torque member 108 to the flap body 168 as compared to coupling the traditional steel torque tube to a body of the wing flap. As an example, forming the torque member 108 from the extension members 128 also enables the location of the torque member 108 to be tailored relative to the flap body 164 and/or the fuselage 202, which may be used to optimize penetration of the torque member 108 in the fuselage 202 through the opening 206.

In an example, and as illustrated in FIG. 3, the torque member 108 is located between the leading end 112 and the trailing end 116 of the flap body 164, such as proximate to a middle portion of the flap body 164. In an example, the torque member 108 is located toward the leading end 112 of the flap body 164. In an example, the torque member 108 is located toward the trailing end 116 of the flap body 164.

In an example, the torque member 108 has a cross-sectional shape that at least partially matches, or matches a portion of, a cross-sectional shape of the flap body 164 as viewed from the inboard end 124. The cross-sectional shape of the torque member 108 at least partially matching the cross-sectional shape of the flap body 164 at the inboard end 124 of the flap body 164 may reduce complexity associated with coupling the torque member 108 to the flap body 164 and may reduce the impact the torque member 108 has on the aerodynamic characteristics of the wing flap 100 and/or the aircraft 200. As used herein, components having at least partially matching cross-sectional shapes may have, but do not require, matching sizes and/or dimensions.

In an example, the torque member 108 has a non-circular cross-sectional shape. As an example, the torque member 108 has a polygonal cross-sectional shape. In the illustrative example, the torque member 108 has a rectangular cross-sectional shape. In another illustrative example, the torque member 108 has a cross-sectional shape including a combination of linear and arcuate sides, such as three substantially linear sides and a fourth arcuate side connecting two linear sides to form a generally rectangular cross-sectional shape.

In an example, the torque member 108 includes, or is at least partially formed by, a front wall 156, a rear wall 158 that is opposite the front wall 156, an upper wall 160, and a lower wall 162 that is opposite the upper wall 160. The front wall 156 and the rear wall 158 are coupled to the flap body 164.

In an example, a first one of the plurality of extension members 128 forms the front wall 156 and a second one of the plurality of extension members 128 forms the rear wall 158. The upper wall 160 and the lower wall 162 are contiguous with the upper skin 102 and the lower skin 104, respectively. In an example, at least one of the upper wall 160 and the lower wall 162 has a profile shape that matches a portion of the flap body 164 as viewed from the inboard end 124, for example, that matches a portion of a profile shape of at least one of the upper skin 102 and the lower skin 104.

A profile shape of each one of the front wall 156, the rear wall 158, the upper wall 160, and the lower wall 162, as viewed from the inboard end 124, defines the cross sectional shape of the torque member 108. In an example, the profile shape of one or more of the front wall 156, the rear wall 158, the upper wall 160, and the lower wall 162 is planar. In an example, the profile shape of one or more of the front wall 156, the rear wall 158, the upper wall 160, and the lower wall 162 is curved.

Figure 4:
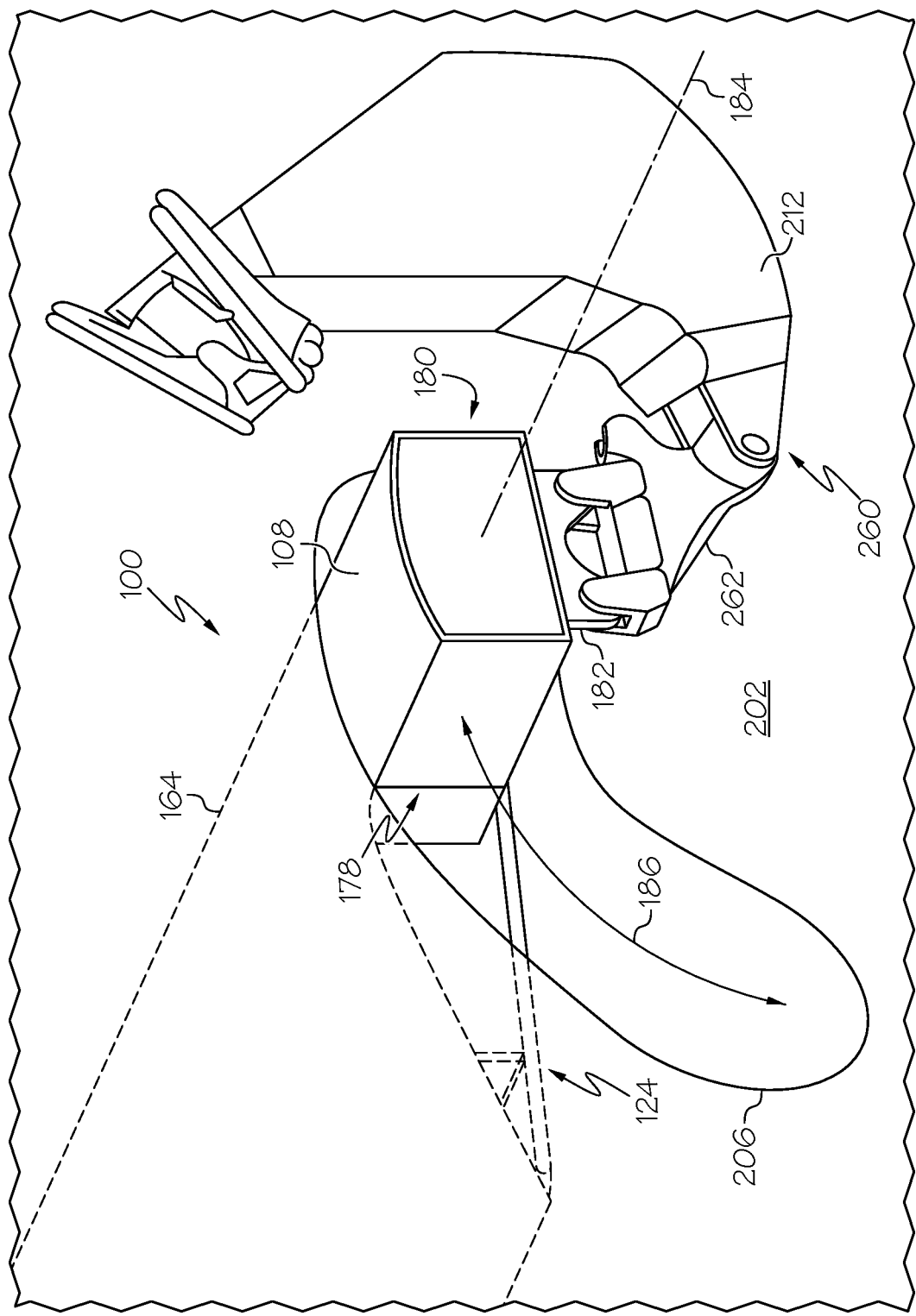
FIG. 4 is a schematic, interior, perspective view of an example of a portion of the aircraft showing an example of a torque member of the disclosed wing flap extending through an opening in a fuselage of the aircraft.

Referring to FIG. 4, the flap body 164 of the wing flap 100 is actuated or moved between the raised and lowered positions by way of the torque member 108, which extends through the opening 206 formed in the fuselage 202. The opening 206 is configured to enable a full range of motion for the torque member 108 and the associated flap body 164 during operation. In an example, the flap actuator 260 includes a flap support mechanism 212, also commonly referred to as a flap carriage mechanism, and a motorized actuator (not shown) that is operatively coupled with the flap support mechanism 212. In an example, the inboard end 180 of the torque member 108 is coupled to the flap support mechanism 212.

FIG. 4 shows the wing flap 100 in a generally raised position with the torque member 108 extending through the opening 206 in the fuselage 202 and coupled to the flap support mechanism 212. In an example, the torque member 108 is configured to rotate, or is configured to be rotated, about an axis of rotation 184 to pivot or rotate the flap body 164 relative to the wing 214. Alternatively, or in addition to, in an example, the torque member 108 is configured to translate, or is configured to be translated, forward and aft along a travel path 186 to move the flap body 164 between a forward/raised position and an aft/lowered position. In an example, the travel path 186 is arcuate and, thus, the opening 206 is elongate and arcuate to enable a full range of motion of the wing flap 100 (the torque member 108 and the flap body 164 associated therewith) during operation. Rotation of torque member 108 enables the flap body 164 to pivot about the axis of rotation 184 during actuation of the wing flap 100. In an example, the axis of rotation 184 is a central longitudinal axis of the torque member 108.

In an example, the torque member 108 also includes a mounting flange 182 that is located at the outboard end 178 of the torque member 108 and that is configured to be coupled to the flap support mechanism 212. In an example, the flap support mechanism 212 includes a carrier mechanism 262, which is also commonly referred to as a carrier beam. The carrier mechanism 262 is coupled to the inboard end 180 of the torque member 108 and transfers motion to the torque member 108 during actuation of the flap support mechanism 212. In an example, the carrier mechanism 262 includes one or more link members that are pivotally coupled to the mounting flange 182 to enable rotational and translational movement of the torque member 108, in which an instantaneous center of rotation of the torque member 108 varies along the travel path 186.

Referring to FIG. 5, in an example, the wing flap 100 includes an inboard flap fairing 190 that is coupled to the flap body 164 proximate to the inboard end 124 of the flap body 164. The inboard flap fairing 190 moves with the wing flap 100 relative to the fuselage 202 during actuation of the wing flap 100. In an example, the wing flap 100 also includes a door 188 that is coupled to the torque member 108. The door 188 moves with the torque member 108 and is located relative to the fuselage 202 such that the door 188 covers at least a portion of the opening 206 (FIG. 4) in the fuselage 202 during actuation of the wing flap 100.

Figure 8:
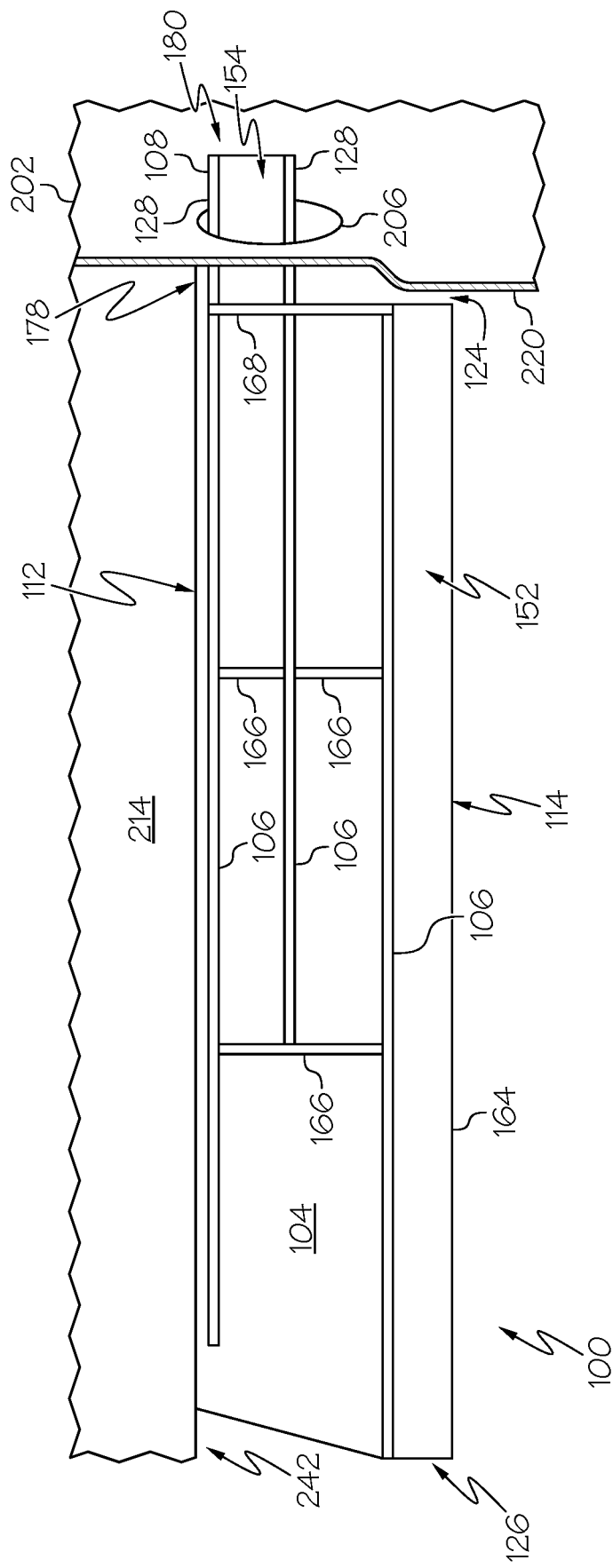
FIG. 8 is a schematic, plan view of an example of the disclosed wing flap.

Referring to FIGS. 6-8, in an example, the upper skin 102 (the upper skin 102 is not shown in FIGS. 7 and 8) and/or the lower skin 104 are permanently coupled with the spars 106. As examples, one or both of the upper skin 102 and the lower skin 104 may be connected to the spars 106 by various kinds of fasteners (not shown), the spars 106 may be co-cured with one or both of the upper skin 102 and/or the lower skin 104, the spars 106 may be structurally bonded (e.g., adhesively bonded) with one or both of the upper skin 102 and/or the lower skin 104, or a combination thereof.

Referring to FIG. 6, in an example, each one of the spars 106 includes an upper spar cap 170, a lower spar cap 172 that is opposite the upper spar cap 170, and a spar web 174 that extends between the upper spar cap 170 and the lower spar cap 172. The upper spar cap 170 is coupled to the upper skin 102 and the lower spar cap 172 is coupled to the lower skin 104. Each one of the spars 106 has one of various cross-sectional shapes defined by the relative configuration of the upper spar cap 170, the lower spar cap 172, and the spar web 174. In an example, at least one of the spars 106 has a constant cross-sectional shape along a longitudinal axis of the spar 106. In an example, at least one of the spars 106 has a variable, or non-constant, cross-sectional shape along the longitudinal axis of the spar 106.

In an example of the spar 106, one end of the spar web 174 is connected to an end of the upper spar cap 170 and the other end of the spar web 174 is connected to an end of the lower spar cap 172 and both the upper spar cap 170 and the lower spar cap 172 project from the same side of the spar web 174 (commonly referred to as having a C-shape or U-shape in cross-section).

In an example of the spar 106, one end of the spar web 174 is connected to a middle portion of the upper spar cap 170 (e.g., between the ends of the upper spar cap 170) and the other end of the spar web 174 is connected to a middle portion of the lower spar cap 172 (e.g., between the ends of the lower spar cap 172) and both the upper spar cap 170 and the lower spar cap 172 project from the both sides of the spar web 174 (commonly referred to as having a I-shape or H-shape in cross-section).

Referring to FIGS. 7 and 8, in an example, the flap body 164 is partially formed by the spars 106 and the torque member 108 is partially formed by the extension members 128. In an example, the spars 106 extend in a span-wise direction between the outboard end 126 of the flap body 164 and the inboard end 124 of the flap body 164. The spars 106 are structural members, or load-bearing element, of the flap body 164. The extension members 128 extend between the outboard end 178 and the inboard end 180 of the torque member 108.

The spars 106 may be formed of any suitable structural material. In an example, the spars 106 are formed of a metallic material. In an example, the spars 106 are formed of a composite material (e.g., carbon fiber reinforced polymer).

In an example, at least one of the upper skin 102 and the lower skin 104 includes a skin major portion 152 and a skin extension portion 154 that extends from the skin major portion 152. The flap body 164 is partially formed by the skin major portion 152 and the torque member 108 is partially formed by the skin extension portion 154.

In an example, the skin major portion 152 extends in a span-wise direction between the outboard end 126 and the inboard end 124 of the flap body 164 and in the chord-wise direction between the leading end 112 and the trailing end 116 of the flap body 164. The skin extension portion 154 extends from the inboard end 124 of the flap body 164 in the inboard direction. The skin extension portion 154 extends over (e.g., covers) and is coupled to the extension members 128.

The skin major portion 152 and the skin extension portion 154 are integrally formed as a single part, or single piece, that forms a unitary body of the upper skin 102 an/or the lower skin 104. The upper skin 102 an/or the lower skin 104 may be formed of any suitable structural material. In an example, the upper skin 102 an/or the lower skin 104 are formed of a metallic material. In an example, the upper skin 102 an/or the lower skin 104 are formed of a composite material (e.g., carbon fiber reinforced polymer).

In an example, the torque member 108 is formed by two extension members 128, each being coupled to the inboard rib 168 of the flap body 164. In an example, the torque member 108 is formed by three extension members 128, each being coupled to the inboard rib 168 of the flap body 164. In an example, the torque member 108 is formed by two extension members 128 and at least one extension rib 176 (FIG. 7) that is coupled to the extension members 128. In any of these examples, the torque member 108 may also be formed by the skin extension portion 154 of at least one of the upper skin 102 and/or the lower skin 104.

In an example, at least one of the extension members 128 is laterally offset relative to one of the spars 106. In an example, and as illustrated in FIG. 7, each one of the extension members 128 is laterally offset relative to adjacent ones of the spars 106. In an example, at least one of the extension members 128 is coaxially aligned with one of the spars 106. In an example, and as illustrated in FIG. 8, each one of the extension members 128 is coaxially aligned with one of the spars 106 associated therewith.

In an example, any one of the extension members 128 includes an upper extension cap, a lower extension cap that is opposite the upper extension cap, and an extension web that extends between the upper extension cap and the lower extension cap. Each one of the extension members 128 has one of various cross-sectional shapes (e.g., C-shape, I-shape, etc.) defined by the relative configuration of the upper extension cap, the lower extension cap, and the extension web. In an example, at least one of the extension members 128 has a constant cross-sectional shape along a longitudinal axis of the extension member 128. In an example, at least one of the extension members 128 has a variable, or non-constant, cross-sectional shape along the longitudinal axis of the extension member 128. In some examples, the cross-sectional shape of the extension members 128 substantially matches the cross-sectional shape of the spars 106 used to form the flap body 164. In an example, the skin extension portion 152 of at least one of the upper skin 102 and/or the lower skin 104 is coupled to opposing ends of one or more of the extension members 128 (e.g., the upper extension cap and the lower extension cap).

Referring to FIG. 8, in an example, the flap body 164 also includes additional structural elements. In an example, the flap body 164 also includes additional ones of the spars 106 extending between the outboard end 126 and the inboard end 124 of the flap body 164. In an example, the flap body 164 also includes a plurality of outboard ribs 166 (also referred to individually as outboard rib 166) extending between the upper skin 102 and the lower skin 104. In an example, the outboard ribs 166 extend in a chord-wise direction between adjacent pairs of the spars 106.

Referring to FIGS. 9-12, in an example, the plurality of spars 106 includes a front spar 110 that is located proximate to (e.g., at or near) the leading end 112 of the flap body 164. In an example, the plurality of spars 106 also includes a rear spar 114 that is located proximate to the trailing end 116 of the wing flap 100. In an example, the plurality of spars 106 also includes a middle spar 118 that is located between the front spar 110 and the rear spar 114. In FIGS. 9-12, the upper skin 102 is not shown.

Referring to FIG. 9, in an example, the wing flap 100 includes the front spar 110 and the rear spar 114. In an example, the front spar 110 and the rear spar 114 extend between the outboard end 126 and the inboard end 124 of the flap body 164. In an example, the inboard rib 168 extends between and is coupled to the front spar 110 and the rear spar 114. In an example, the inboard rib 168 also extends between the upper skin 102 (not shown in FIG. 9) and the lower skin 104 in a chord-wise direction and is coupled to the upper skin 102 and the lower skin 104. The flap body 164 is partially formed by the front spar 110, the rear spar 114, and the inboard rib 168. Each one of the plurality of extension members 128 is located between the front spar 110 and the rear spar 114 when viewed from the inboard end 124 of the flap body 164.

In an example, the plurality of extension members 128 includes a first extension member 144 (e.g., a first one of the extension members 128) that is coupled to the inboard rib 168. In an example, the plurality of extension members 128 includes a second extension member 146 (e.g., a second one of the extension members 128) that is coupled to the inboard rib 168. The torque member 108 includes (is partially formed by) the first extension member 144 and the second extension member 146. The first extension member 144 and the second extension member 146 extend between the outboard end 178 and the inboard end 180 of the torque member 108.

In an example, the first extension member 144 and the second extension member 146 are laterally spaced away from one another. In an example, the first extension member 144 and the second extension member 146 are parallel to each other. In an example, the first extension member 144 is laterally spaced away from the front spar 110 toward the rear spar 114. In an example, the second extension member 146 is laterally spaced away from the rear spar 114 toward the front spar 110.

Referring to FIG. 10, in an example, the wing flap 100 includes the front spar 110, the middle spar 118, and the rear spar 114. In an example, the front spar 110, the middle spar 118, and the rear spar 114 extend between the outboard end 126 and the inboard end 124 of the flap body 164. In an example, the inboard rib 168 extends between the front spar 110 and the rear spar 114 and is coupled to the front spar 110, the middle spar 118, and the rear spar 114. The flap body 164 is partially formed by the front spar 110, the middle spar 118, the rear spar 114, and the inboard rib 168. The torque member 108 is partially formed by the first extension member 144 and the second extension member 146.

In an example, the first extension member 144 is located between the front spar 110 and the middle spar 118 when viewed from the inboard end 124 of the flap body 164. In an example, the second extension member 146 is located between the rear spar 114 and the middle spar 118 when viewed from the inboard end 124 of the flap body 164.

Referring to FIG. 11, in an example, the wing flap 100 includes the front spar 110 and the rear spar 114. In an example, the front spar 110 and the rear spar 114 extend between the outboard end 126 and the inboard end 124 of the flap body 164. In an example, the inboard rib 168 extends between and is coupled to the front spar 110 and the rear spar 114. The flap body 164 is partially formed by the front spar 110, the rear spar 114, and the inboard rib 168.

In an example, the plurality of extension members 128 includes a third extension member 148 (e.g., a third one of the extension members 128) that is coupled to the inboard rib 168. In an example, the third extension member 148 is located between the first extension member 144 and the second extension member 146 when viewed from the inboard end 124 of the flap body 164. The torque member 108 includes (is partially formed by) the first extension member 144, the second extension member 146, and the third extension member 148. The first extension member 144, the second extension member 146, and the third extension member 148 extend between the outboard end 178 and the inboard end 180 of the torque member 108.

Referring to FIG. 12, in an example, the wing flap 100 includes the front spar 110 and the rear spar 114. In an example, the front spar 110 and the rear spar 114 extend between the outboard end 126 and the inboard end 124 of the flap body 164. In an example, the inboard rib 168 extends between and is coupled to the front spar 110 and the rear spar 114. The flap body 164 is partially formed by the front spar 110, the rear spar 114, and the inboard rib 168.

In an example, the torque member 108 includes (is partially formed by) an extension rib 176 that extends between the first extension member 144 and the second extension member 146. In an example, the extension rib 176 is located at any one of various locations between the outboard end 178 and the inboard end 180 of the torque member 108. The extension rib 176 is configured to redistribute loads between the first extension member 144 and the second extension member 146 during actuation of the wing flap 100. In an example, the extension rib 176 extends between and/or is coupled to the upper skin 102 (not shown in FIG. 12) and/or the lower skin 104.

In an example, the torque member 108 includes a plurality of extension ribs 176, as illustrated in FIG. 12. In an example, the extension ribs 176 are equally spaced along the torque member 108 between the outboard end 178 and the inboard end 180 of the torque member 108. The number of extension ribs 176 may vary depending, for example, on the loads applied to the torque member 108, failsafe requirements of the torque member 108, and required stiffness of the torque member 108. In an example, one of the extension ribs 176 is located proximate to the inboard end 180 of the torque member 108. In an example, at least one other of the extension ribs 176 is located between the outboard end 178 and the inboard end 180 of the torque member 108, for example, between the one of the extension ribs 176 located at the inboard end 180 of the torque member 108 and the inboard rib 168.

Figure 14:
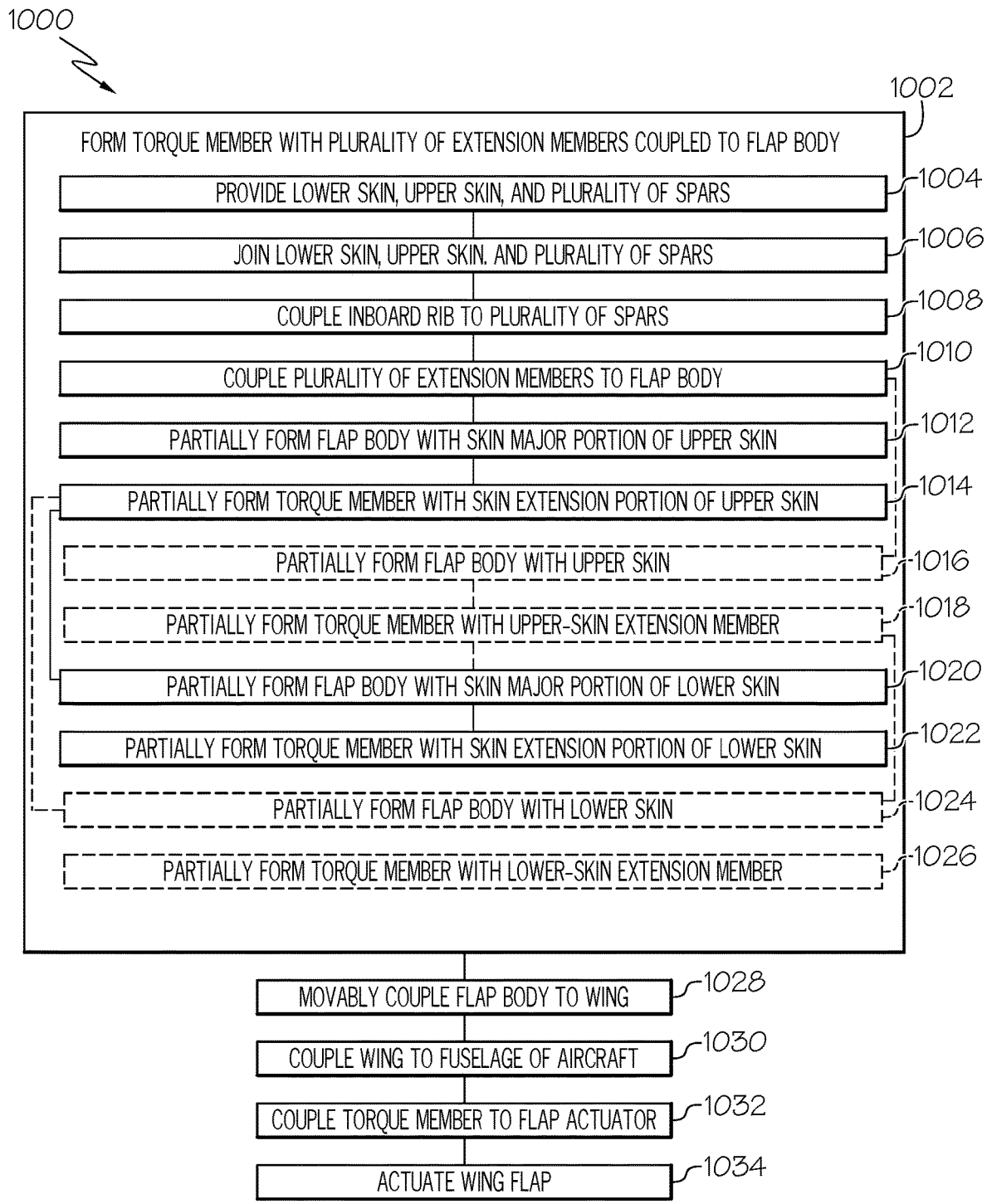
FIG. 14 is a flow diagram of an example of a disclosed method.

Referring to FIG. 14, in an example, the wing flap 100 includes the front spar 110 and the rear spar 114. The flap body 164 is partially formed by the front-spar major portion 120 and the rear spar 114. The torque member 108 is partially formed by the front-spar extension portion 122. In an example, the front-spar major portion 120 and the rear spar 114 extend between the inboard end 124 and the outboard end 126 of the flap body 164 and the front-spar extension portion 122 extends between the outboard end 178 and the inboard end 180 of the torque member 108.

While not illustrated in FIGS. 11 and 12, in other examples, the flap body 164 may also include additional ones of the spars 106 (e.g., the middle spar 118).

In the examples shown in FIGS. 9-12, the first extension member 144 forms the front wall 156 (FIG. 3) of the torque member 108 and the second extension member 146 forms the rear wall 158 (FIG. 3) of the torque member 108. In the examples shown in FIGS. 9-12, the skin extension portion 154 of the upper skin 102 (not shown in FIGS. 9-12), also referred to as upper-skin extension portion, forms the upper wall 160 (FIG. 3) of the torque member 108 and the skin extension portion 154 of the lower skin 104, also referred to as lower-skin extension portion, forms the lower wall 162 of the torque member 108. The skin major portion 152 of the upper skin 102, also referred to as upper-skin major portion, forms an upper skin panel of the flap body 164 and the skin major portion 152 of the lower skin 104, also referred to as lower-skin major portion, forms a lower skin panel of the flap body 164.

Figure 13:
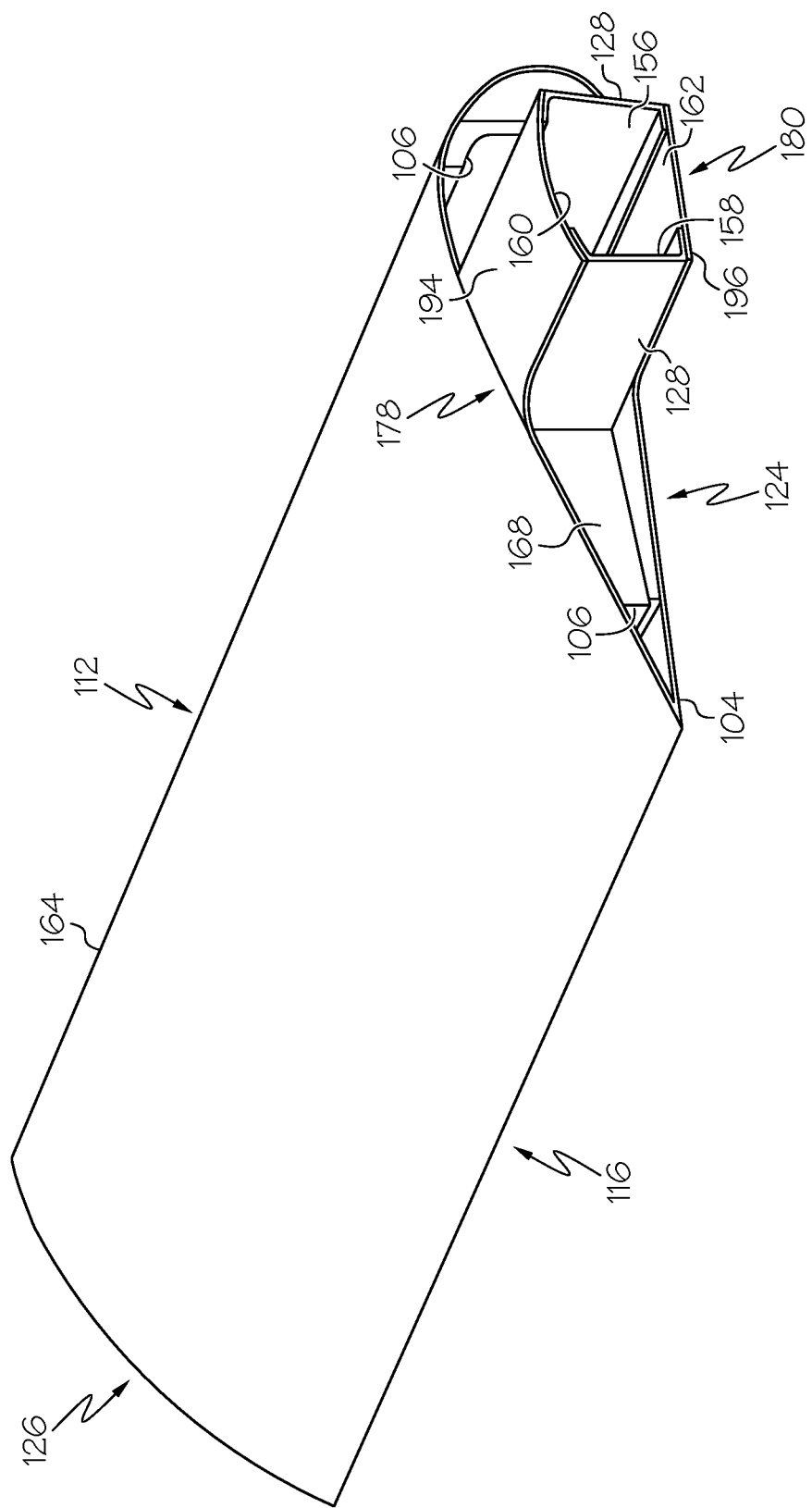
FIG. 13 is a schematic, perspective view of an example of the disclosed wing flap.

Referring to FIG. 13, in an example, one or both of the upper skin 102 and/or the lower skin 104 partially form only the flap body 164. In an example, one or both of the upper skin 102 and/or the lower skin 104 extends between the outboard end 126 and the inboard end 124 of the flap body 164 and terminates at the inboard end 124 of the flap body 164.

In an example, the wing flap 100 also includes an upper-skin extension member 194 that takes the place of the upper-skin extension portion. In an example, the upper-skin extension member 194 extends between the inboard end 180 and the outboard end 178 of the torque member 108 and is coupled to the extension members 128 (e.g., the first extension member 144 and the second extension member 146). The upper-skin extension member 194 is contiguous with the upper skin 102. The torque member 108 includes (is partially formed by) the upper-skin extension member 194.

In an example, the wing flap 100 also includes a lower-skin extension member 196 that takes the place of the lower-skin extension portion. In an example, the lower-skin extension member 196 extends between the inboard end 180 and the outboard end 178 of the torque member 108 and is coupled to the extension members 128 (e.g., the first extension member 144 and the second extension member 146). The lower-skin extension member 196 is contiguous with the lower skin 104. The torque member 108 is partially formed by the lower-skin extension member 196.

In the illustrative examples, the skin extension portion 154 of the upper skin 102 and the lower skin 104, the upper-skin extension member 194, and the lower-skin extension member 196 extend all the way to and terminate at the inboard end 180 of the torque member 108. In other examples, one or more of the skin extension portion 154 of the upper skin 102 and the lower skin 104, the upper-skin extension member 194, and/or the lower-skin extension member 196 terminates prior to the inboard end 180 of the torque member 108. In an example, the skin extension portion 154 of the upper skin 102 and the lower skin 104, the upper-skin extension member 194, and/or the lower-skin extension member 196 extends at least to a point on the torque member 108 in which the torque member 108 enters the fuselage 202 through the opening 206 (FIG. 4).

In some aerospace implementations, failsafe measures may be beneficial to ensure continued safe flight and landing. An example of a failsafe measure is to have a redundant load path that is not utilized until failure of a primary load path. Another example of a failsafe measure is to have two or more load paths in which failure of any one of the load paths redistributes the load to another one of the load paths, each of which is capable of reacting to the entire load. Another example of a failsafe measure is to have adequate reserve loading capability in each of the structural members defining a given load path such that the load path is capable to react to the entire load after failure, damage, or other impairment to one of the structural members.

In some examples, such as the illustrative example shown in FIG. 11, the torque member 108 of the disclosed wing flap 100 includes a failsafe configuration. In an example (FIG. 11), pairs of two adjacent extension members 128 may form redundant load paths. In an example, the first extension member 144 and the third extension member 148 define a first load path, the third extension member 148 and the second extension member 146 define a second load path, and the first extension member 144 and the second extension member 146 define a third load path. In this example, each one of the load paths is capable of reacting to the entire load applied to the wing flap 100 and a failure in one of the load paths (e.g., resulting from damage to one of the extension members 128) may be redistributed to the other load path. In an example, one of the redundant load paths is loaded and another one of the redundant load paths is unloaded. Upon a failure in the loaded load path, the load is distributed to the unloaded load path. In an example, each one of the redundant load paths is loaded and either one of the loaded load paths is capable of reacting to the entire load upon failure of the other.

In some examples, such as the illustrative examples shown in FIGS. 9, 10, and 12, the torque member 108 of the disclosed wing flap 100 may also include a failsafe configuration. In an example, each of the extension members 128 has a reserve loading capacity that exceeds the entire load applied to the wing flap 100. In an example (FIGS. 9, 10, and 12), the first extension member 144 and the second extension member 146 define the load path and each one of the first extension member 144 and the second extension member 146 has a reserve loading capacity that exceeds the entire load applied to the wing flap 100.

Referring to FIG. 14, also disclosed is an example method 1000. In an example, the method 1000 is utilized for forming the wing flap 100. In an example, the method 1000 includes a step of forming the torque member 108 with the plurality of extension members 128 that are coupled to the flap body 164 to form the wing flap 100 (Block 1002). The flap body 164 is configured to be movably coupled with the wing 214 of the aircraft 200. The torque member 108 is configured to be operatively coupled with the flap actuator 260 of the aircraft 200.

In an example, the method 1000 includes a step of providing the lower skin 104, the upper skin 102, and the plurality of spars 106 (Block 1004). As used herein, the term "providing" does not require any particular delivery or receipt of the provided item. Rather, the term "providing" is used to refer to items that are available for use or that are otherwise in a state or condition of being ready for use.

In an example, the method 1000 includes a step of joining the lower skin 104, the upper skin 102, and the plurality of spars 106 together to partially form the flap body 164 (Block 1006). Various methods or operations may be utilized to join the lower skin 104, the upper skin 102, and the plurality of spars 106 including, but not limited to, fastening, co-curing, bonding, or combinations thereof.

In an example, the method 1000 includes a step of coupling the inboard rib 168 to the plurality of spars 106 to partially form the flap body 164 (Block 1008). In an example, the inboard rib 168 extends between an adjacent pair of the spars 106 at the inboard end 124 of the flap body 164.

In an example, the method 1000 includes a step of coupling the plurality of extension members 128 to the inboard end 124 of the flap body 164 to partially form the torque member 108 (Block 1010). In an example, the plurality of extension members 128 is coupled to the inboard rib 168.

In an example, the method 1000 includes steps of partially forming the flap body 164 with the skin major portion 152 of the upper skin 102 (Block 1012) and partially forming the torque member 108 with the skin extension portion 154 of the upper skin 102 (Block 1014). Alternatively, the method 1000 includes steps of partially forming the flap body 164 with the upper skin 102 (Block 1016) and partially forming the torque member 108 with the upper-skin extension member 194 (Block 1018).

In an example, the method 1000 includes steps of partially forming the flap body 164 with the skin major portion 152 of the lower skin 104 (Block 1020) and partially forming the torque member 108 with the skin extension portion 154 of the lower skin 104 (Block 1022). Alternatively, the method 1000 includes steps of partially forming the flap body 164 with the lower skin 104 (Block 1024) and partially forming the torque member 108 with the lower-skin extension member 196 (Block 1026).

In an example, the method 1000 is further utilized for forming the wing 214 of the aircraft 200. In an example, the method 1000 includes a step of movably coupling the flap body 164 of the wing flap 100 to the wing body 258 of the wing 214 at the trailing edge 242 of the wing 214 (Block 1028). In accordance with the method 1000, the wing flap 100 may be coupled to the wing 214 during manufacture of the wing 214. Alternatively, in accordance with the method 1000, a conventional inboard flap of the aircraft 200 may be replaced with the wing flap 100, such as during maintenance or repair of the aircraft 200.

In an example, the method 1000 is further utilized for forming the aircraft 200. In an example, the method 1000 includes a step of coupling the wing 214 to the fuselage 202 of the aircraft 200 (Block 1030). In an example, the method 1000 includes a step of operatively coupling the inboard end 180 of the torque member 108 with the flap actuator 260 (Block 1032). In an example, the torque member 108 extends into the fuselage 202 through the opening 206 in the fuselage 202.

In an example, the method 1000 is also utilized for operating the wing flap 100. In an example, the method 1000 includes a step of actuating the wing flap 100 between the raised and lowered positions (Block 1034). In an example, the flap actuator 260 pivots and/or translates the flap body 164 of the wing flap 100 relative to the wing 214 via the torque member 108.

Figure 15:
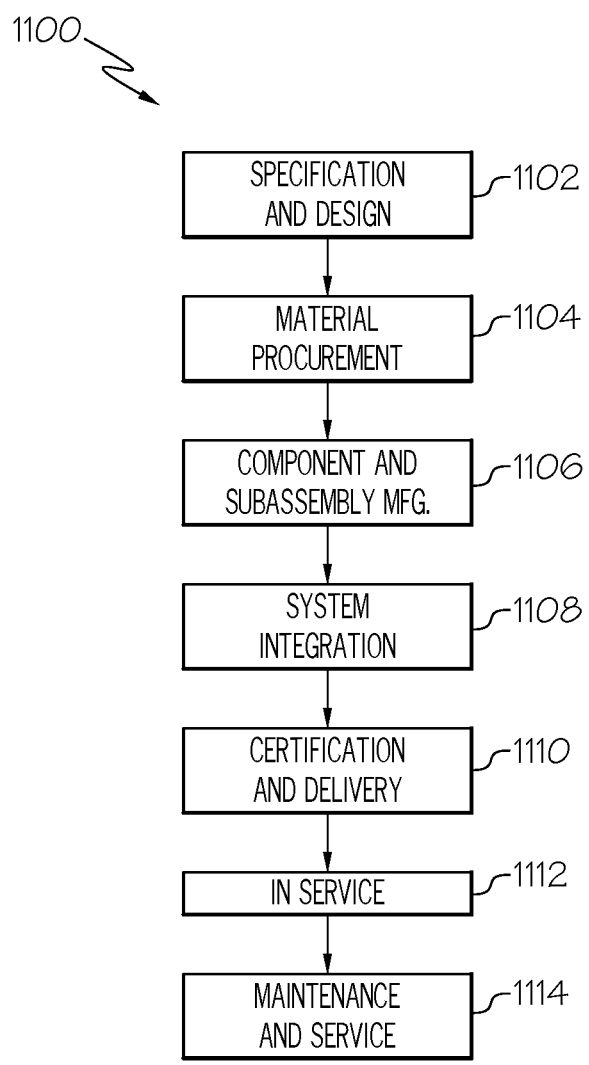
FIG. 15 is a flow diagram of an example aircraft production and service methodology.

Examples of the wing flap 100 and method 1000 disclosed herein may find use in a variety of potential applications, particularly in the transportation industry, including for example, aerospace applications. Referring now to FIGS. 1 and 15, examples of the wing flap 100 and method 1000 may be used in the context of an aircraft manufacturing and service method 1100, as shown in the flow diagram of FIG. 15, and the aircraft 200, as shown in FIG. 1. Aircraft applications of the disclosed examples may include formation of the wing flap 100 and use of the wing flap 100 as a flight control surface of the aircraft 200.

As shown in FIG. 15, during pre-production, the illustrative method 1100 may include specification and design of the aircraft 200 (Block 1102) and material procurement (Block 1104). During production of the aircraft 200, component and subassembly manufacturing (Block 1106) and system integration (Block 1108) of the aircraft 200 may take place. Thereafter, the aircraft 200 may go through certification and delivery (Block 1110) to be placed in service (Block 1112). The disclosed wing flap 100 and method 1000 may form a portion of component and subassembly manufacturing (Block 1106) and/or system integration (Block 1108). Routine maintenance and service (Block 1114) may include modification, reconfiguration, refurbishment, etc. of one or more systems of the aircraft 200, such as repair and/or replacement of inboard wing flaps.

Each of the processes of illustrative method may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Examples of the wing flap 100 and method 1000 shown or described herein may be employed during any one or more of the stages of the manufacturing and service method 1100 shown in the flow diagram illustrated by FIG. 15. For example, components or subassemblies, such as the wing flap 100 or the wing 214, corresponding to component and subassembly manufacturing (Block 1106) may be fabricated or manufactured in a manner similar to components or subassemblies produced while the aircraft 200 is in service (Block 1112). Also, one or more examples of the wing flap 100, method 1000, or combinations thereof may be utilized during system integration (Block 1108) and/or certification and delivery (Block 1110). Similarly, one or more examples of the wing flap 100, method 1000, or a combination thereof, may be utilized, for example and without limitation, while the aircraft 200 is in service (Block 1112) and during maintenance and service (Block 1114).

Although an aerospace example is shown, the principles disclosed herein may be applied to other industries, such as the automotive industry. Accordingly, in addition to aircraft, the principles disclosed herein may apply to other vehicles, (e.g., land vehicles, marine vehicles, space vehicles, etc.).

Reference herein to "example" means that one or more feature, structure, element, component, characteristic and/or operational step described in connection with the example is included in at least one embodiment and or implementation of the subject matter according to the present disclosure. Thus, the phrase "an example" and similar language throughout the present disclosure may, but do not necessarily, refer to the same example. Further, the subject matter characterizing any one example may, but does not necessarily, include the subject matter characterizing any other example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Unless otherwise indicated, the terms "first", "second", etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, "coupled", "coupling", and similar terms refer to two or more elements that are joined, linked, fastened, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

In FIGS. 14 and 15, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 14 and 15 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Although various embodiments and/or examples of the disclosed antenna, aerospace vehicle and method have been shown and described, modifications may occur to those skilled in the art upon reading the specification. The present application includes such modifications and is limited only by the scope of the claims.

What is claimed is:

1. A wing flap, comprising:
   a flap body comprising:
      an upper skin;
      a lower skin, opposite the upper skin; and
      a plurality of spars that extend between the upper skin and the lower skin; and
   a torque member, comprising an axis of rotation and a plurality of extension members, and wherein:
   each one of the extension members is coupled to the flap body and is spaced from an adjacent one of the plurality of extension members in a direction, transverse to the axis of rotation; and
   a portion of the torque member is contiguous with at least one of the upper skin and the lower skin.

2. The wing flap of claim 1, wherein the torque member has a non-circular cross-sectional shape.

3. The wing flap of claim 1, wherein:
   the flap body further comprises an inboard end and an outboard end opposite the inboard end; and
   each one of the plurality of extension members is coupled to the inboard end of the flap body.

4. The wing flap of claim 3, wherein:
   the flap body further comprises an inboard rib that is coupled to the plurality of spars at the inboard end of the flap body; and
   each one of the plurality of extension members is coupled to the inboard rib.

5. The wing flap of claim 4, wherein:
   the plurality of spars comprises a front spar and a rear spar;
   the inboard rib extends between the front spar and the rear spar; and
   each one of the plurality of extension members extends outwardly from the inboard end of the flap body.

6. The wing flap of claim 5, wherein:
   the plurality of extension members comprises a first extension member that is laterally spaced from the front spar.

7. The wing flap of claim 6, wherein:
   the plurality of extension members further comprises a second extension member that is laterally spaced from the rear spar.

8. The wing flap of claim 7, wherein:
   the plurality of extension members further comprises a third extension member that is located between the first extension member and the second extension member.

9. The wing flap of claim 5, wherein:
   the plurality of spars further comprises a middle spar located between the front spar and the rear spar; and
   the plurality of extension members comprises:
      a first extension member that is located between the front spar and the middle spar; and
      a second extension member that is located between the rear spar and the middle spar.

10. The wing flap of claim 1, wherein each one of the plurality of extension members is parallel to an adjacent one of the plurality of extension members.

11. The wing flap of claim 1, wherein:
    at least one of the upper skin and the lower skin comprises a skin major portion and a skin extension portion that extends from the skin major portion;
    the flap body is partially formed by the skin major portion; and
    the torque member is partially formed by the skin extension portion.

12. The wing flap of claim 1, wherein the torque member comprises at least one of an upper-skin extension member that is contiguous with the upper skin and a lower-skin extension member that is contiguous with the lower skin.

13. The wing flap of claim 1, wherein the torque member further comprises an extension rib that is coupled to and extends between an adjacent pair of the plurality of extension members.

14. A wing of an aircraft, the wing comprising:
    a wing body; and
    a wing flap, comprising:
       a flap body that is coupled to and is movable relative to the wing body, the flap body comprising:
          an upper skin;
          a lower skin, opposite the upper skin; and
          a plurality of spars, each extending between the upper skin and the lower skin; and
       a torque member that comprises an axis of rotation and a plurality of extension members, and wherein:
       each one of the extension members is coupled to the flap body and is spaced from an adjacent one of the plurality of extension members in a direction transverse to the axis of rotation; and
       a portion of the torque member is contiguous with at least one of the upper skin and the lower skin.

15. The wing of claim 14, wherein the torque member has a non-circular cross-sectional shape.

16. The wing of claim 14, wherein the torque member is configured to be coupled to a flap actuator of the aircraft.

17. The wing of claim 14, wherein:
    at least one of the upper skin and the lower skin comprises a skin major portion and a skin extension portion that extends from the skin major portion;
    the flap body is partially formed by the skin major portion; and
    the torque member is partially formed by the skin extension portion.

18. The wing of claim 14, wherein:
    the flap body further comprises an inboard end and an outboard end opposite the inboard end; and
    each one of the plurality of extension members is coupled to the inboard end of the flap body.

19. The wing of claim 18, wherein:
    the flap body further comprises an inboard rib that is coupled to the plurality of spars at the inboard end of the flap body; and
    each one of the plurality of extension members is coupled to the inboard rib.

20. A method for forming a wing flap, the method comprising:
    joining an upper skin, a lower skin, and a plurality of spars to at least partially form a flap body; and
    coupling a plurality of extension members to the flap body to partially form a torque member, comprising an axis of rotation, and wherein:
    each one of the extension members is spaced from an adjacent one of the plurality of extension members in a direction transverse to the axis of rotation;
       the flap body is configured to be coupled to and movable relative to a wing of an aircraft about the axis of rotation; and
       the torque member is configured to be coupled to a flap actuator of the aircraft.

* * * * *